United States Patent [19]
Williams

[11] Patent Number: 5,740,915
[45] Date of Patent: Apr. 21, 1998

[54] PACKAGE FOR A PLANAR ELEMENT

[75] Inventor: David E. Williams, Fayetteville, Ga.

[73] Assignee: Creative South, Inc., Fayetteville, Ga.

[21] Appl. No.: 797,171

[22] Filed: Feb. 10, 1997

[51] Int. Cl.$^6$ ........................................ A45C 11/18
[52] U.S. Cl. ........................ 206/555; 206/454; 206/39
[58] Field of Search ........................... 206/37, 39, 38, 206/449, 555, 450, 454, 425

[56] References Cited

U.S. PATENT DOCUMENTS 3,294,229  12/1966  McConnell et al. .................. 206/449
5,217,056   6/1993  Ritter ............................ 206/39 X
5,593,075   1/1997  Schumer .......................... 206/555

*Primary Examiner*—Jacob K. Ackun
*Attorney, Agent, or Firm*—Rodgers & Rodgers

[57] ABSTRACT

A package for a planar element such as a telephone calling card having a pair of panels foldably joined and disposed in flat face contacting relation with the calling card disposed therebetween and at least a portion thereof disposed beyond the peripheries of the panels in order to allow manipulation of the exposed portion in a card activation process.

7 Claims, 2 Drawing Sheets

PACKAGE FOR A PLANAR ELEMENT

BACKGROUND OF THE INVENTION

In recent years, the communications industry has undergone a massive transformation, one result of which is the proliferation of telephone calling cards. Calling cards are desirable and much in demand because they provide a convenient and economical means by which long distance calling time can be purchased.

In actual practice, a user purchases a calling card at an appropriate retail outlet such as a convenience store. The specific number of calling minutes in a particular card is typically electronically encoded therein during the production process and actual calling time is deducted as calls are made until the card has no residual value at which time it is simply discarded. Obviously, if a calling card containing inherent monetary value is displayed openly in a retail environment, it is a ready-made target for theft.

Known calling card packages encase the card totally in packaging material which prohibits the ability to display a calling card in a deactivated or worthless state with the desired monetary value encoded into the card by means of subsequent activation.

SUMMARY OF THE INVENTION

According to this invention, a package is provided for a planar element such as a telephone calling card with the front and rear panels being foldably joined together in flat contacting relation with the calling card disposed intermediate the panels and a portion thereof extending beyond the peripheries of the panels and with an auxiliary flap foldably joined to one of the panels and disposed in flat face contacting relation with the calling card.

DESCRIPTION OF THE PREFERRED EMBODIMENT

Figure 1:
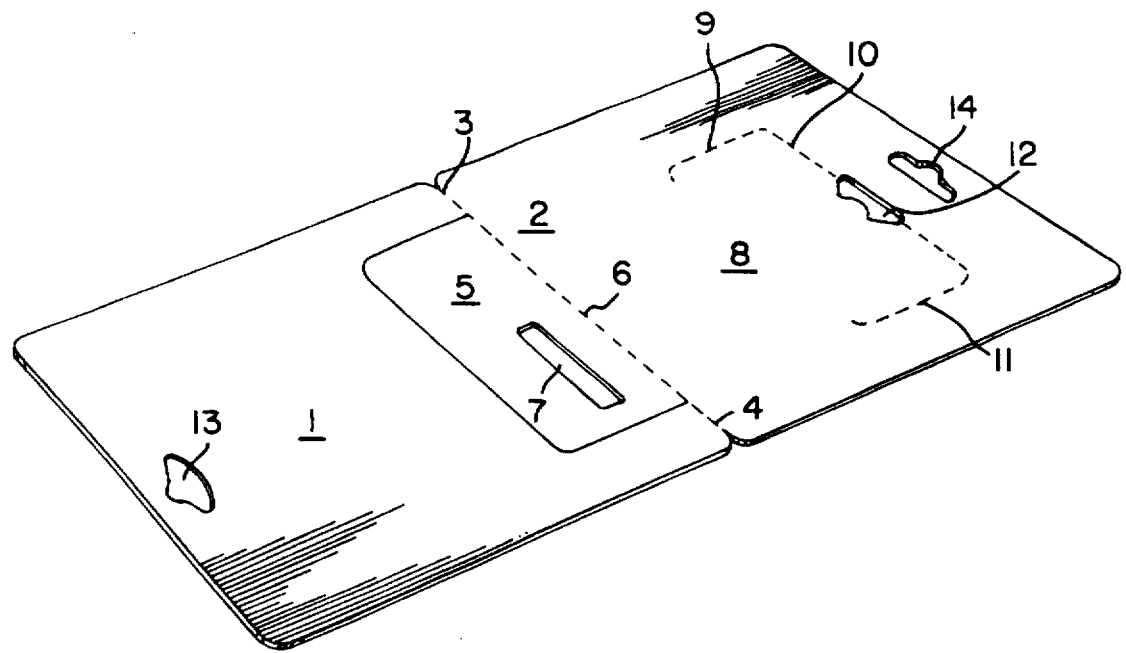
FIG. 1 is a perspective view of the package blank according to this invention.

In the drawings, the numeral 1 designates the front panel of the calling card package to which rear panel 2 is foldably joined along fold lines 3 and 4. Auxiliary flap 5 is foldably joined to rear panel 2 along fold line 6 which is intermediate and in alignment with fold lines 3 and 4. In addition, data aperture 7 is formed in auxiliary flap 5, as shown in FIG. 1, and is utilized to allow the viewing of information entered on the packaged calling card such as for card tracking purposes.

To complete the package blank, information flap 8 is formed in rear panel 2 by means of score lines 9, 10 and 11 and is used to list any desired data thereon such as that required by the FCC and the like. Also, manipulation aperture 12 is struck from rear panel 2 midway along score line 10. Finally, apertures 13 and 14 are formed in front panel 1 and rear panel 2, respectively, for the purpose of hanging the package on a display rack as is well known.

Figure 2:
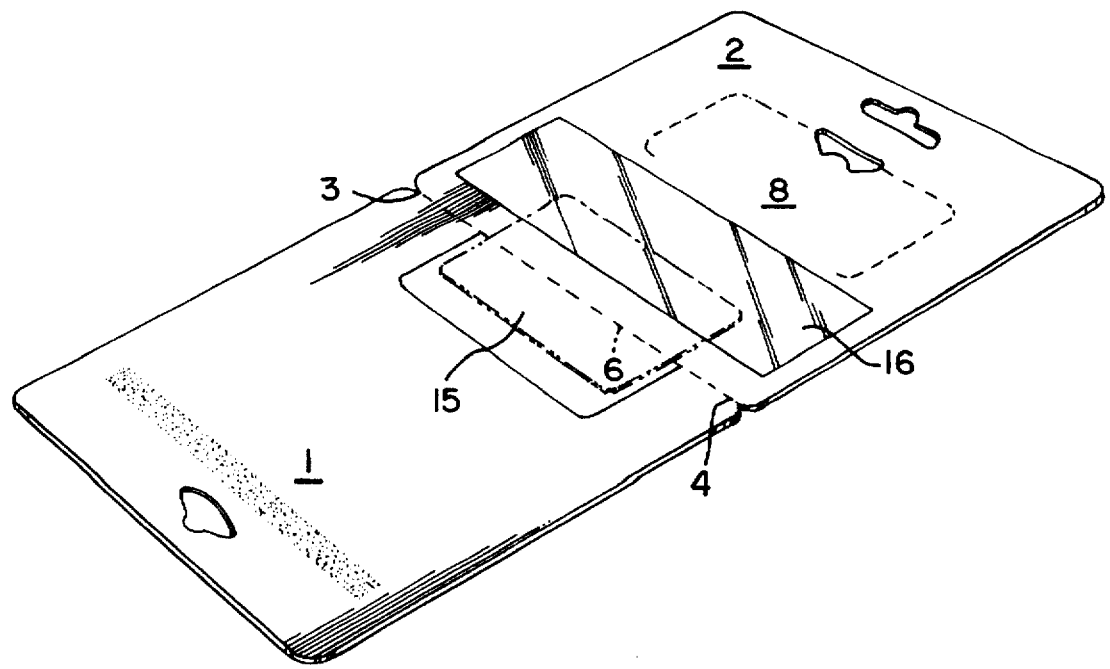
FIG. 2 is a perspective view, similar to FIG. 1, with the planar calling card secured in position.
Figure 3:
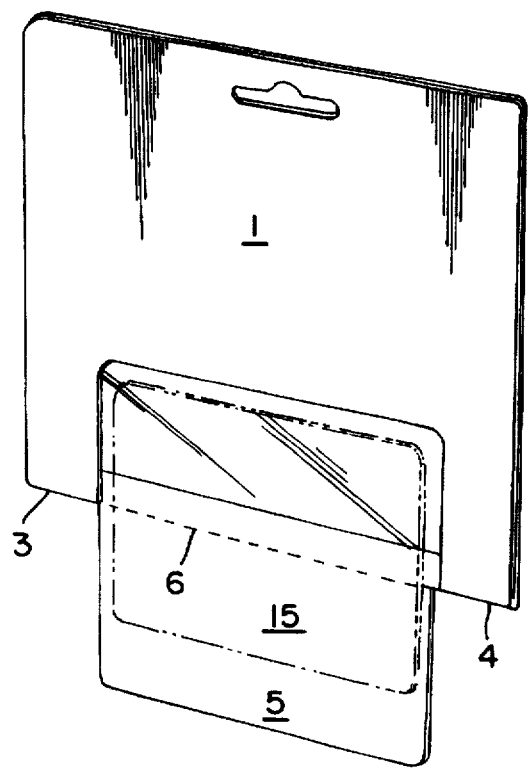
FIG. 3 is a perspective front view of the package in completed condition.

In order to form the package, as best shown in FIG. 2, a planar element, such as telephone calling card 15, is placed astride fold line 6 and secured in place by means of clear adhesive tape 16. In order to complete the package from its disposition in FIG. 2 to that shown in FIG. 3, it is simply necessary to apply glue to front panel 1, as indicated by stippling in FIG. 2, and then fold front panel 1 up and over along fold lines 3 and 4 into flat face contacting relation with rear panel 2. The package can then be placed on an appropriate merchandising display by known cooperation between apertures 13 and 14 and a display hang rod.

Figure 4:
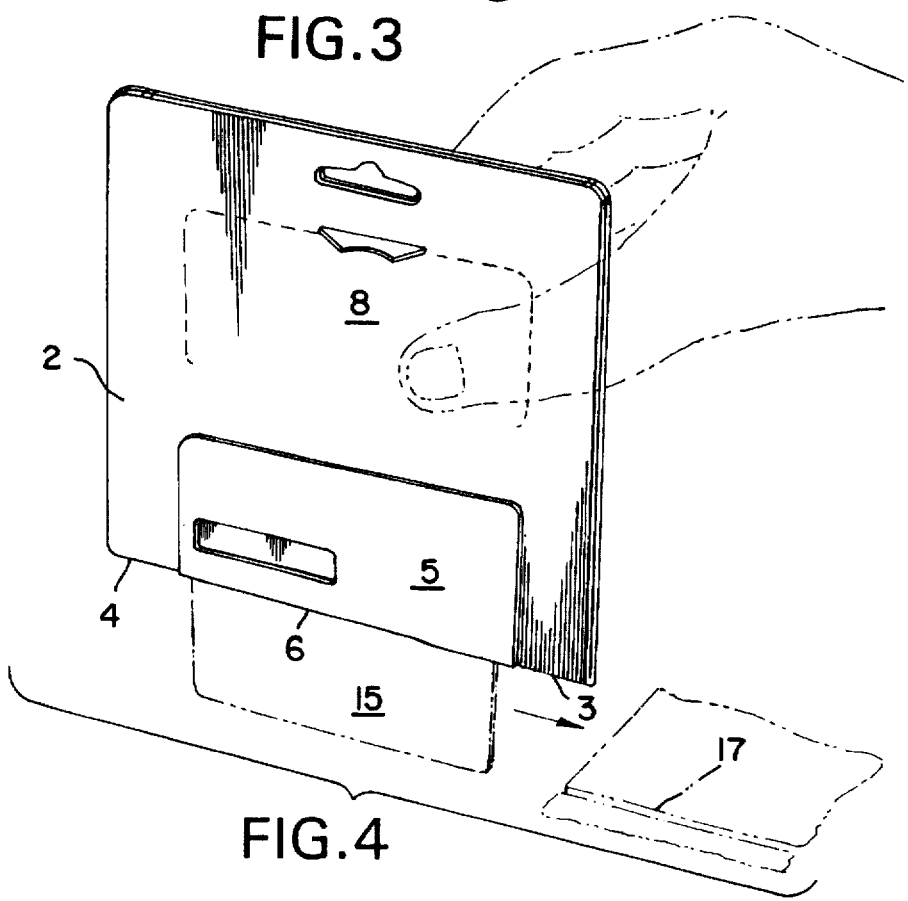
FIG. 4 is a perspective rear view of the completed package with the calling card in the process of activation.

According to this invention, calling card 15 is displayed in a nonactivated or valueless state. Activation is accomplished at the point of purchase such as by a clerk folding auxiliary flap 5 180 degrees about fold line 6 into flat face contacting relation with rear panel 2, as shown in FIG. 4. By this means, the lower portion of card 15 is exposed such that it can be slipped through activation slot 17 or any other appropriate electronic device for the purpose of encoding the desired calling time valuation therein.

Therefore, by this invention, a package is provided for telephone calling cards and the like by which the card is displayed in an inactivated state. Then, as desired, the card can be activated at the point of purchase thereby eliminating the problem of the pilferage of activated cards which are openly displayed prior to actual purchase.

I claim:

1. A package for a planar element comprising a front panel, a rear panel foldably joined along at least one fold line to said front panel and being disposed in flat face contacting relation therewith, said planar element being disposed intermediate said panels with a portion thereof extending beyond the associated peripheries of said panels, and an auxiliary flap foldably joined to said rear panel and disposed in flat face contacting relation with said portion of said planar element.

2. A package according to claim 1 wherein an information flap is struck from said rear panel and is integrally joined thereto.

3. A package according to claim 2 wherein a manipulation aperture is formed along one edge of said information flap.

4. A package according to claim 1 wherein a data aperture is formed in said auxiliary flap.

5. A package for a planar element comprising a front panel, a rear panel foldably joined along at least one fold line to said front panel and being disposed in flat face contacting relation therewith, said planar element being disposed intermediate said panels with a portion thereof extending beyond the associated peripheries of said panels, and said planar element being secured in place by means of adhesive tape.

6. A package according to claim 5 wherein an information flap is struck from said rear panel and is integrally joined thereto.

7. A package according to claim 6 wherein a manipulation aperture is formed along one edge of said information flap.

* * * * *